Nov. 2, 1954 K. B. CZARNECKI 2,693,018
PROCESS OF FORMING LIGHTWEIGHT AGGREGATE
Filed June 20, 1951
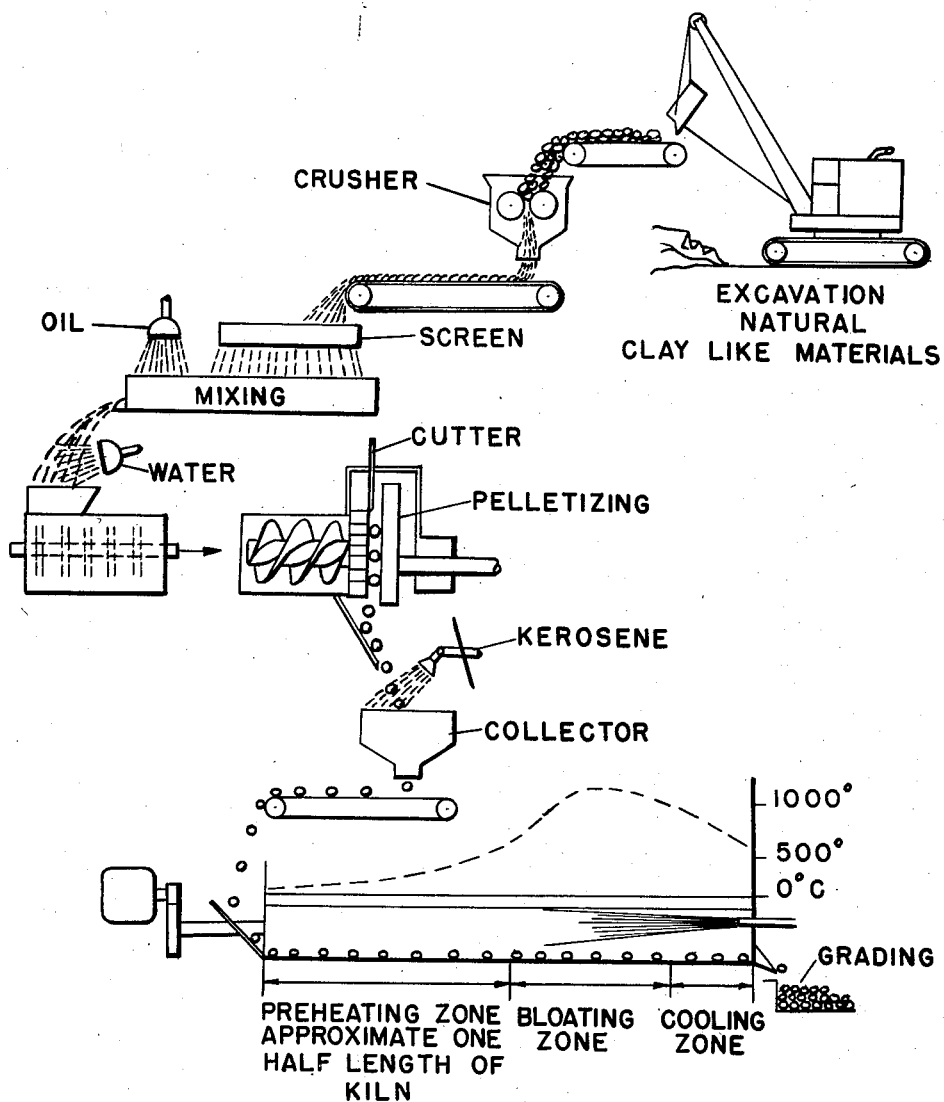
KAMIL B. CZARNECKI INVENTOR.
BY
Jerome R. Cox
Attorney

United States Patent Office 2,693,018
Patented Nov. 2, 1954

2,693,018

PROCESS OF FORMING LIGHTWEIGHT AGGREGATE

Kamil B. Czarnecki, London, England, assignor to The Ohio State University Research Foundation, Columbus, Ohio, a corporation of Ohio Application June 20, 1951, Serial No. 232,579

11 Claims. (Cl. 25—156)

The invention disclosed in this application relates to the production of lightweight aggregate from certain clays, shales, silts, slates or mixtures of two or more of them, or from similar raw materials and to the lightweight aggregate so produced.

Prior hereto the use of oil has been mentioned for the purpose of providing some additional fuel inside of a clay body and mention has been made in certain cases of the use of hydrocarbon oil as a mean of separating one pebble of the aggregate from another and thus as a means of aiding in preventing the sticking problem. Oil has also been mentioned as a source of an additional amount of carbon in the clay body. It has also been suggested that rounded pebbles might be obtained by firing in a rotary kiln. Nevertheless the majority of the lightweight aggregates, actually produced heretofore, have a very angular and sharp shape. Even when an attempt is made to form rounded pebbles in a rotary kiln the diameter, exact shape, etc. cannot possibly be accurately controlled by prior processes.

One of the objects of my invention is the production of a lightweight aggregate with a strong oxidized outer shell, ideally rounded shape, and an interior expanded so as to decrease the specific gravity of the aggregate.

Another object of my invention is the provision of a method for the production of lightweight aggregate, effective to produce excellent lightweight aggregate when used with any one of a wide variety of clay-like materials.

A further object of my invention is the production of lightweight aggregate by a method utilizing the combination of (1) a hydrocarbon of relatively low vapor pressure (which may be designated as an internal oil) as a source of expansion gases and also as a possible source of some heat at the same time and (2) a coating of a hydrocarbon having a relatively high vapor pressure (which may be designated as an external oil) as a quick source of additional external heat.

A further object of my invention is the production of a lightweight aggregate which has a very dense, hard, and substantially impermeable oxidized outer shell in which the strength and thickness of the load bearing shell can be predetermined and controlled.

Further objects and features of my invention will be apparent from the subjoined specification and claims when considered in connection with the accompanying drawings which illustrate an embodiment of my invention.

In the drawings the figure is a diagrammatic view showing the steps of a process which comprises an embodiment of my invention.

According to my process, the production of lightweight aggregate consists, as shown in the figure, of the steps of taking natural clay-like materials and mixing them with a hydrocarbon having a relatively low vapor pressure such as for example a crude oil (or an oil emulsion), thereafter mixing them with water (or additional water if desired), thereafter forming them into pellets of the desired size and shape, thereafter spraying with an easily volatilized oil (i. e. having a high vapor pressure) such as for example, kerosene, and thereafter firing for a relatively short time and at a relatively low temperature, in an oxidizing atmosphere. As is also indicated in the figure, it is usually necessary to grind the clay-like materials (before mixing with the first of the hydrocarbons) in order to reduce the size of the particles to the required degree of fineness. The clay-like materials which I desire to use comprise clays, silts, shales, slates and similar raw materials. The hydrocarbons which I desire to mix with the clay-like materials are hydrocarbons which have a relatively low vapor pressure and which boil at relatively high temperatures as compared to the hydrocarbon (such as gasoline and kerosene) which is sprayed on the pellets later. Inasmuch as unrefined petroleum and certain (sometimes unused) fractions thereof have suitable average boiling points and are relatively inexpensive they will usually be used as the initial mixing or internal oil in the commercial practice of my invention. I propose to use cheap oils for this purpose. I hereby define "clay-like materials" for use in this specification and claims to comprise the usable clays, silts, shales, slates and similar raw materials.

The hydrocarbon which is mixed with the raw materials and thus is trapped within the interior of the pellets will have a relatively low vapor pressure, a relatively high boiling point and a relatively high flash point as compared with the hydrocarbon which is to be sprayed on later. Said hydrocarbon to be mixed with the raw materials will sometimes hereinafter be referred to as an L. V. P. hydrocarbon.

The hydrocarbon which is to be sprayed on to the surface of the pellets will have a relatively high vapor pressure, a relatively low boiling point and a relatively low flash point as compared with the hydrocarbon which is earlier mixed with the raw materials. Said hydrocarbon to be sprayed on will sometimes hereinafter be referred to as an H. V. P. hydrocarbon.

In the following description and in the claims where I speak of an H. V. P. hydrocarbon or a hydrocarbon oil having a relatively high vapor pressure I, of course, mean a hydrocarbon oil having a relatively high vapor pressure relative to the mixed oil (i. e. the L. V. P. hydrocarbon). Such H. V. P. hydrocarbon will also have a relatively low boiling point and a relatively low flash point.

As shown in the figure my process may at times consist of all or part of the following eleven steps:

1. Mining of the raw material;
2. Grinding or crushing and screening (when necessary);
3. Addition of L. V. P. hydrocarbon;
4. Addition of water;
5. Cutting into slugs or pebbles of the desired size;
6. Forming into pellets of rounded shape;
7. Spraying with H. V. P. hydrocarbon;
8. Preheating;
9. Bloating (i. e. firing or burning);
10. Cooling; and
11. Grading.

Many of the above steps are similar to those used in other lines of the ceramic industry. I believe however that some of these steps are entirely new and have never before been used in the exact detail, order, and combination in which I use them in the production of lightweight aggregates. Such steps will be described in detail in this application.

It is necessary according to my process to have the raw materials ground to 20-mesh and finer by one of the usual methods unless the raw materials are naturally satisfactory in this respect.

Once the raw material is sized to the required degree, the addition of the L. V. P. hydrocarbon may take place by spraying said hydrocarbon over the dry, screened, raw material and mixing. The L. V. P. hydrocarbon may be added if desired while grinding. The amount of L. V. P. hydrocarbon added varies according to the nature of the raw material, but generally speaking, it should be between 2 and 5% by weight of the raw material. Finely ground raw materials readily absorb such L. V. P. hydrocarbon and therefore the proper mixing and distribution of the L. V. P. hydrocarbon is assured. The L. V. P. hydrocarbon is added not primarily as a fuel, but as a source of considerable amount of gases which when evolved during the firing will expand appreciably the volume of the pyroplastic pebble. A portion of the added L. V. P. hydrocarbon is not burned out, but is reduced to coke. This coke causes the final expansion. The pressure of gases will expand any clay-like body when the clay-like body is heated to the semi-plastic state. In the case of clay which, due to its natural organic mixtures (impurities), would expand readily by itself, this addition of the L. V. P. hydrocarbon provides an additional amount of gases which, under proper heat treatment, will expand each pebble of clay to a sufficient degree at a much lower temperature, thus making it possible to save a considerable amount of fuel during the firing in the kiln and possibly also to prolong the life of the refractory lining of the kiln. The introduction of the L. V. P. hydrocarbon could be carried out in many ways, one method being to spray the L. V. P. hydrocarbon onto the dry, screened clay. I prefer to add no water until after the L. V. P. hydrocarbon has been added, distributed and absorbed. However, it may be possible that the L. V. P. hydrocarbon may be added as an emulsion with water and thereafter additional water may be added if required. The subsequent water mixing step may be omitted if sufficient water can be added in an emulsion.

It is a known fact that most oils do not mix well with water. This is a reason that under my process I prefer that the L. V. P. hydrocarbon be introduced, uniformly distributed and absorbed by the screened dry clay before any water is added. The amount of water added will vary according to the properties of the clay, but generally it should be about 15–25% by weight of the raw material. The important point is that the clay mass should not be too wet, but rather have a heavy plastic consistency which will assure a better forming operation. The above mentioned addition of water may be made in an ordinary pug mill or in similar equipment or may be added in the extrusion machine itself.

After the sticky mass of clay or shale, mixed with L. V. P. hydrocarbon and water has been put through the pug mill it may be extruded through a die having multiple openings. Very close to the die there may be provided a cutter which separates short cylinders of clay from the extruding mass. As pointed out below we may utilize this step for forming the pellets into substantially rounded pellets.

I have found that a round sphere-like shape of the aggregate combined with a strong solid outer shell is very important as it provides the best service in the concrete mix from the point of view of strength, workability, theory of packing and low water absorption. Although this principle may be generally recognized and agreed to, nevertheless a great majority of commercial aggregates have an irregular, angular, sharp and ununiform structure which characteristics are highly detrimental to the aggregate, especially with reference to good packing in the resultant concrete. Even the so-called "round" aggregates are only less angular than the others and are not specially formed to a round shape by a special operation provided before forming. For this reason in the case of many existing commercial aggregates there are hardly two pebbles alike in shape. Under my process there is a special forming operation. I have shown in the drawing one method and apparatus for doing this. Other processes and apparatus may be used. One method I propose to use can best be compared to forming a round ball from plastic clay (or from snow or dough) by rolling the substance between the hands, moving the hands eccentrically but parallel to each other. Very close to the cutting plate and opposite and parallel to it there is provided a forming plate which revolves eccentrically. The die and the forming plate can both be in a vertical or horizontal attitude or may be at an angle to the vertical and horizontal. The forming plate (due to its rotation) shapes the short extruded cylinders of clay mass into rounded pebbles. The distance between the die and the forming plate can be adjusted to any required length. If the forming plate is kept at a fixed distance from the die all pebbles produced have the same diameter and thus the aggregate will be produced in one size only. However, when it is desired to produce aggregate of a different size the distance between the cutting plate and the forming plate can be varied so as to vary the size of the aggregate. If for any reason it is desired to have aggregate of different sizes in the same batch, the distance between the cutting plate and the forming plate may be changed continuously by the forward and backward movement of the forming plate simultaneously with its eccentric rotation and the aggregate may be produced in many different sizes.

I also propose that I may extrude the material as a rod through the die against a non-rotating plate to cause the section of the rod which is outside the die to bulge. Then I propose to cut off this section and thus form separate pellets which are substantially round or rounded and which will become even more nearly round on firing. Many other methods of forming round, rounded, or substantially round pellets may be used. For certain uses of the aggregate I prefer that the pebble should have a size of between about 0.25 cubic inch to about 4.0 cubic inches. For some uses, larger sizes may be preferable.

From the forming plate, the rounded pebbles are thrown into a collector which by reason of its shape directs the whole mass of round pebbles into a spraying zone. While they are in the spraying zone, each pebble is sprayed with a liquid which has a higher vapor pressure, a lower boiling point, and a lower flash point than that of the L. V. P. hydrocarbon. The use of kerosene is suggested as suitable. In any case, the liquid used must be quite volatile. It should be of organic nature and as cheap as possible. The difference in vapor pressure of the two hydrocarbons (as for example oil and kerosene), which are the two sources of gases and of vapor pressure, is important. This difference in vapor pressure is one of the main advantages of my process and an outstanding difference of my process when compared with the existing processes of production of lightweight aggregate by the expansion of clay or shale. My process is thus based to some extent on the difference in vapor pressure on the surface and on the inside of each pebble. In fact, one of the main advantages in my process may be said to be due, to a large extent, to the fact that the two liquids added (crude oil and kerosene for example) have a different vapor pressure and the fact that the liquid on the surface of each pebble has a higher vapor pressure than the liquid added to the clay body during the mixing. The evaporation of the two liquids—and thus the evolution of gases, takes place at different temperatures. For this reason, the principle discussed here may be described as a differential vapor pressure principle. This however, should not be thought of as similar to the known method of selective chemical analysis where differential vapor pressures are involved. When the mass of pebbles is introduced into the preheating zone of the kiln, the surface of each pebble is exposed to the heat treatment long before the interior becomes hot enough to begin the evolution of volatile gases. For this reason the H. V. P. hydrocarbon (e. g. the very volatile kerosene) begins to evaporate before the evaporation of the L. V. P. hydrocarbon starts. The result is that on the surface of each pebble, a film of high vapor pressure is formed. This vapor pressure is caused by the pressure of highly inflammable H. V. P. hydrocarbon gases. This ring of high pressure vapor provides inflammable gases on the surface which are effective to start the actual firing at a comparatively low temperature and thus help in softening and finally sealing the surface of each pebble before gases of the interior are evolved. Thus, during the actual expansion of each pebble, in the firing zone of the kiln, a large amount of gases will be present within the pebble and therefore the maximum temperature of firing will not have to be as high as is usually necessary for the required degree of expansion. Because the required degree of expansion when L. V. P. hydrocarbon and H. V. P. hydrocarbon (e. g. oil and kerosene) are added, can be achieved at lower temperature, there is therefore no need to fire the whole mass of the aggregate to a very high temperature, when there would be danger of developing a very soft and sticky surface. Thus the problem of sticking of the aggregate to the wall of the kiln is minimized.

While I have spoken above of spraying the pellets with kerosene, any other suitable method of coating the pellets with a hydrocarbon having a relatively high vapor pressure is satisfactory. I have dipped the pellets in kerosene and have found that method also satisfactory.

My aggregate may be fired in an ordinary rotary kiln such as is used for the production of other known lightweight aggregates. In the drawing there is no slope for the rotary kiln shown, but obviously a slope of approximately the usual degree should be utilized. My aggregate has the advantage that it can also be fired in a stationary kiln with moving rates. In some respects the stationary kiln may be more desirable. The operation and the time-temperature control in a stationary kiln is much easier than in a rotary kiln. A stationary kiln itself is usually cheaper than a rotary kiln. I emphasize however that regardless of the type of kiln, the firing should be done in an oxidizing atmosphere.

According to my method the time-temperature ratios decide the required speed of swelling and the degree of expansion of each pebble. A careful adjustment must be made for each different raw material used. The following can be described as average normal conditions of firing when a certain rotary kiln was used in forming lightweight aggregate from certain clays using either a crude oil (Ohio Crude 358) as it came from the oil well or a distilled fraction thereof (Distilled 151) boiling approximately in the range of 638° F. to 780° F. as the L. V. P. hydrocarbon and using a kerosene as the H. V. P. hydrocarbon.

(a) The length of the kiln should be about 75–100 feet and the diameter 6–8 feet;
(b) An oxidizing atmosphere must be maintained throughout the whole kiln;
(c) The speed of rotation of the kiln should be controlled by the pyro behavior of the raw material in the kiln but generally the speed should be between 2 and 5 rotations a minute;
(d) Gas or oil should be used for heating but when necessary powdered coal would give satisfactory results;
(e) The temperature gradients should be carefully adjusted;
(f) Excess of heat should be avoided. The maximum temperature in the firing zone under average conditions should be between 1000° C. and 1260° C. The high percentage of L. V. P. hydrocarbon added reduces the maximum temperature required by about 100° C. which means a considerable saving in the amount of fuel necessary to fire the kiln and adds to the life of the kiln lining;
(g) The speed of movement of the whole mass of pebbles along the kiln should be coordinated with the temperature gradient. Both should be able to be adjusted when necessary. Under average conditions the time necessary for pebbles to move the entire length of the kiln will be between 18 and 30 minutes, depending upon the natural pyro behavior of the raw materials used under this particular heat treatment;
(h) The well known and very difficult problems (1) of the sticking of the whole mass of the aggregate to the interior wall of the rotary kiln and (2) of the sticking of the particles of the aggregate to each other, will under my process, be substantially avoided due to the following factors:
(1) The ideally rounded shape of the pebbles;
(2) The process of substantially sealing the surface of the pebble at a much lower temperature than has been required under other processes;
(3) A faster rotation of the kiln may in some cases be used as a preventative.

Lightweight aggregate or pebbles manufactured under my process will float indefinitely as is proved by tests on aggregate which I have manufactured.

In general the preheating period should be from about 15 minutes to 22 minutes, the bloating period should be from about 5 minutes to about 10 minutes, and the cooling period from about 4 minutes to about 10 minutes; and the temperature in the preheating zone should be less than about 1000° C. (i. e. about 1800° F.) but gradually rise toward that temperature, the temperature in the bloating zone should be between about 1000° C. and 1260° C. (i. e. about 1800° F. to 2300° F.) depending upon the material being bloated and the degree of bloating desired and the temperature in the cooling zone should decrease gradually from the final temperature of the bloating zone toward room temperatures.

When the mass of my pebbles is introduced into the preheating zone in the kiln, the surface of each pebble is exposed to the heat treatment long before the interior becomes hot enough to begin the evolution of interior gases. For this reason the very volatile H. V. P. hydrocarbon begins to evaporate and to burn to a considerable degree before the evaporation of the interior crude oil starts. The result is that a film of inflammable kerosene gases forms on the surface of each pebble at a relatively low temperature in the preheating zone of the kiln (regardless of the type of kiln that may be used) and the kerosene gases are evolved to a great degree while the interior gases from the crude oil and the interior gases from water are just beginning to form. The film of kerosene vapor starts the actual burning at a comparatively low kiln temperature and thus helps in softening and finally in sealing the surface of each pebble long before an appreciable amount of the interior gases are formed. Thus a very strong outer shell is formed, the thickness of which is controlled by the time during which the pebble is kept in the preheating zone. This time can be adjusted according to the required strength and the required lightness of the aggregate. It must be remembered, however, that at the higher temperature end of the preheating zone several parallel processes are taking place including:

(a) A tendency toward faster expansion of interior as well as exterior gases;
(b) The development of a thicker solid outer shell.

The longer the mass of aggregate is kept in the preheating zone the thicker the outer shell of each pebble will be. It is possible to develop a shell which is in thickness at substantially every point more than half the radius of the pebble and in addition has a properly expanded interior. On the other hand, once a very thick shell has been formed in the preheating zone a much higher temperature in the firing zone will be needed to provide the required expansion. It is even possible by proper adjustment of the time-temperature ratio to develop aggregate which will have any desired thickness or shell. For example, it is possible to develop a solid shell throughout the whole pebble (100% of shell), or to develop a highly expanded aggregate with a very thin shell, merely a surface sealed "skin." When a strong lightweight aggregate is required, the thick outer shell will be developed by holding a mass of aggregate for a longer time in the preheating zone of the kiln. When a very light aggregate is required, the mass of pebbles must be moved quite fast through the preheating zone and then kept for a longer time in the firing zone. As the total time of firing is rather short, the distinction between the heating in the preheating zone and the heating in the firing zone of the kiln must be carefully observed.

When the mass of pebbles enters the firing zone of the kiln, each pebble should by that time already have a sufficiently strong outer shell to prevent any substantial amount of the gases from the interior (which now are acquiring a considerable pressure) from escaping through the surface. The stage of incipient vitrification might be considered as the required degree of firing. Under favorable conditions the final volume of each pebble can be doubled or even tripled. Thus from one cubic yard of raw material two or more cubic yards of aggregate can be produced. When a strong (but lightweight) aggregate is required this figure will be lower. From an economical point of view it should not, however, be lower than one and one-half cubic yards of aggregate from one cubic yard of raw material. The combination of a very hard solid outer shell and a light expanded sponge-like interior is a unique feature of my aggregate. For average production, the thickness of the shell should not exceed ⅛ of the radius. For my process, the atmosphere inside the kiln should be oxidizing. It has been found during my research that an oxidizing atmosphere inside the kiln helps in developing a strong oxidized outer shell of each pebble.

The operation of cooling of the expanded mass of pebbles of my aggregate is similar to other methods applied now in the industry. The hot mass of my pebbles can be discharged however from the kiln into a cooling pit where it may remain until properly annealed. While other lightweight aggregates fired to a much higher temperature must go through a cooler first and then be discharged into the cooling pit, my process saves the necessity of much cooling equipment and its operation.

My aggregate does not have to be crushed to the required size. Each pebble of my aggregate retains its round shape after its discharge from the kiln and, therefore, the only operation necessary after cooling, is to screen the whole mass of pebbles to a required size. Even the screening operation is often not necessary. This fact saves expenditure on expensive crushing equipment and also saves considerable time and labor. It is also very important from the point of view of the quality of the final product inasmuch as the operation of crushing invariably exposes many interior cells and, by breaking pebbles into two or more of smaller size forms a considerable amount of undesirable very fine powder-like particles. The exposure of the interior cells makes the aggregate less economical, as more cement paste has to be used to fill all the open cells, and thus the production cost of lightweight concrete is increased by the need for a greater amount of cement. My aggregate absorbs less cement and water (i. e. has less absorption percentage). If the exterior is substantially sealed, the interior cells may be communicating without detriment to the product but if the exterior is porous, it is a distinct disadvantage. Therefore, in short, my product has better packing qualities in the concrete mix. In addition, the lightweight concrete produced from aggregate having a porous exterior will be much heavier when the open pores are filled with cement. With my aggregate (which has each pebble substantially sealed and which does not have to be crushed), a smaller amount of cement can be used and thus a cheaper and lighter lightweight concrete can be produced. The aggregate produced according to my process has a very dense, hard, substantially impermeable, oxidized outer shell. Due to this property, my aggregate when mixed with a cement-water paste does not absorb water. Thus the dangerous phenomena of (1) "moisture movement" in concrete and of (2) "water exchange" between the cement and the aggregate, are avoided.

EXAMPLE I

I chose as a clay for forming specimens of lightweight aggregate a Bedford shale which is not a readily bloating clay but is known when fired very fast to bloat a little. The clay was delivered from a mine near Columbus, Ohio. The color of the clay was a reddish-brown (oxidized). It had the following characteristics:

1. Water of plasticity _____ About 20%.
2. Drying linear shrinkage ___ About 5–6%.
3. Drying volume shrinkage __ About 17–18%.
4. Fired linear shrinkage
   (cone 02) _____ About 12–13%.
5. Best firing range _____ Cone 06 (1841° F.) to cone 1 (2057° F.).
6. Overburning temperature ___ About cone 8 (2237° F.).
7. Deformation temperature ___ Cone 13 (2462° F.).

Chemical analysis

| | Percent |
|---|---|
| Loss on ignition | 7.0 |
| Silica, $SiO_2$ | 59.4 |
| Alumina, $Al_2O_3$ | 17.2 |
| Ferric oxide, $Fe_2O_3$ | 8.9 |
| Lime, CaO | 0.5 |
| Magnesia, MgO | 1.5 |
| Titanic oxide, $TiO_2$ | 1.2 |
| Sodium oxide $Na_2O$ | 0.2 |
| Potassium oxide, $K_2O$ | 2.9 |
| Sulphur, S | 0.0 |
| Total carbon, C | 0.6 |

Burning behaviour

| Temperature | Lin. shrinkage, percent | Vol. shrinkage, percent | Color |
|---|---|---|---|
| Cone 08 | 1.3 | 3.9 | Buff. |
| Cone 06 | 4.1 | 11.8 | Salmon. |
| Cone 04 | 5.8 | 16.5 | Tan. |
| Cone 03 | 6.6 | 18.4 | Gray. |
| Cone 02 | 7.1 | 19.8 | Brown. |
| Cone 01 | 6.9 | 19.3 | Dark red. |
| Cone 1 | 6.5 | 18.3 | Maroon flashes. |
| Cone 4 | 6.4 | 17.9 | Dark red. |
| Cone 7 | 6.1 | 17.1 | Maroon. |

I reduced this material to particles which would pass through a 20-mesh screen. I mixed a small quantity of this clay with about 2% of an Ohio crude oil (code 358) as received from the Oil Research Laboratory of the Engineering Experiment Station of Ohio State University. The oil was an Ohio oil from Athens County having a specific gravity of 0.84. The procedure of the mixing was as follows: The necessary amount of oil was introduced from a burette (½" in diameter) to an empty laboratory mortar in such a way that the oil was sprayed over the side walls and the bottom of the mortar. Then the clay was poured into mortar and left for about five minutes. After this soaking period, I mixed the material with a pestle for about ten minutes. When this was done the batch was left for the night, covered with a slightly moistened rag for aging and for uniform distribution of oil. The following day about 22% of water was added and the batch was mixed by hand in a large pan until I obtained the proper workability. The mixed batch of clay was pressed by hand into the cylinder of a small laboratory extruding machine and then was extruded in the form of a long, round bar. The diameter of this bar was about $9/16$". After extrusion, small cylinders 1" long were cut and formed into substantially round balls or pellets. The pellets were then allowed to dry. After drying, these pellets were covered with kerosene so that the exterior was coated with a film of this volatile oil. The pellets were then fired. A special kiln was designed and built. This kiln was a Meeker gas fired kiln with three burners in the horizontal position to the right side wall of the kiln. A high temperature combustion tube was placed in the kiln. The length of the tube was 30", diameter 1½". The outside surface of the kiln was marked at every inch for measuring the temperature at any spot of the kiln. A moving thermocouple was used, also marked at every inch with a special refractory pencil. For moving the sample through the kiln a porcelain pusher was used which was also marked in inches. A thermocouple was connected to a potentiometer which was placed in front of the kiln. The porcelain tube was extended through the back wall of the kiln. The average rate of movement of the sample was 1" per minute. A special interval timer clock was used to measure these minute intervals. The samples were pushed by a specially prepared and marked pusher. The firing time was about twenty-five minutes. The highest temperature was about 2200° F. At the end of the first three minutes the temperature had arisen to about 100° F. At the end of six minutes it had arisen to about 350° F. At the end of nine minutes it had arisen to about 500° F. At the end of twelve minutes it had arisen to about 1100° F. At the end of fifteen minutes it had arisen to about 1500° F. At the end of eighteen minutes it had arisen to about 2000° F. At the end of twenty minutes it had arisen to about 2200° F. and remained there until about the end of twenty-five minutes. At the end of the twenty-eight minute period the temperature had dropped to about 1600° F. and at the end of thirty minutes it had dropped to approximately room temperature. It could be noticed that after nine minutes a small flame was observed. I found that the most critical zone was between the eight and nine minute intervals, where if samples were moved too fast, cracking occurred. Once the samples passed that zone they could be moved quickly to the highest temperature zone, which in this firing was about between the eighteen minute interval and the twenty-seven minute interval. The whole firing was only for about thirty minutes and the movement during the pre-heating zone from zero to seven minutes was forced as fast as possible so that the sample could be exposed to the high temperature zone for at least five minutes. The resulting pellet as fired was a lightweight ball having a substantially impervious outer shell, a very low specific gravity and a very low percentage factor of absorption.

EXAMPLE II

I chose as a clay for forming additional specimens of lightweight aggregate the same Bedford shale as used in Example I. The clay was delivered from a mine near Columbus, Ohio. The color of the clay was a reddish-brown (oxidized). It had, of course, the same characteristics as those shown in Example I. I reduced this material to particles which would pass through a 20-mesh screen. I mixed a small quantity of this clay with about 2% of the Ohio crude oil (code 358) as received from the Oil Research Laboratory of the Engineering Experiment Station of Ohio State University. The oil was the same Ohio oil as used in Example I. The procedure of the mixing was as follows: The necessary amount of oil was introduced from a burette (½" in diameter) to an empty laboratory mortar in such a way that the oil was sprayed over the side walls and the bottom of the mortar. Then the clay was poured into mortar and left still for about five minutes. After this soaking period, I mixed with a pestle for about ten minutes. When this was done the batch was left for the night, covered with a slightly moistened rag for aging and for uniform distribution of oil. The following day about 22% of water was added and the batch was mixed by hand in a large pan until I obtained the proper workability. The mixed batch of clay was pressed by hand into the cylinder of the small laboratory extruding machine and then was extruded in the form of a long, round bar. The diameter of this bar was about 9/16". After extrusion, small cylinders 1" long were cut and formed into substantially round balls or pellets. The pellets were then dried. After drying, the pellets were covered with kerosene so that the exterior surface was coated with a film of this volatile oil. The pellets were then fired. The same special kiln was used. The high temperature combustion tube was placed in the kiln. For moving the sample through the kiln, the porcelain pusher was used. The thermocouple was connected to a potentiometer which was placed in front of the kiln. The porcelain tube was extended through the back wall of the kiln. The firing time was about twenty-four minutes. The highest temperature was about 1900° F. At the end of the first three minutes the temperature had arisen to about 100° F. At the end of six minutes it had arisen to about 350° F. At the end of nine minutes it had arisen to about 500° F. At the end of twelve minutes it had arisen to about 1100° F. At the end of fifteen minutes it had arisen to about 1500° F. At the end of eighteen minutes it had arisen to about 1900° F. and remained there until about the end of twenty-four minutes. At the end of the twenty-seven minute period the temperature had dropped to about 1500° F. and at the end of thirty minutes it had dropped to approximately room temperature. Thus, the distribution of the temperature along the tube during this firing was similar to the diagram shown in the figure of the drawings. It could be noticed that after nine minutes a small flame was observed. The whole firing was only for about thirty minutes. The finished product was a lightweight ball having a substantially impervious outer shell. Its bulk specific gravity was higher than the product of Example I as was also the factor of absorption percent and apparent porosity, but all of these factors were relatively low as compared with other lightweight aggregate.

It is to be understood that the above described embodiments of my invention are for the purpose of illustration only and various changes may be made therein without departing from the spirit and scope of the invention.

I claim:

1. A process of producing lightweight aggregate which comprises the steps of reducing clay-like raw materials to particles not substantially larger than the size which will pass through a 20-mesh screen; mixing a hydrocarbon oil thoroughly with said material; subsequently mixing water thoroughly with said material of the order of about 15 to 25 parts of water by weight to 100 parts of the raw material; subsequently forming the mixture into slugs each having a volume of from 0.25 cubic inches to about 4.0 cubic inches; subsequently forming the slugs into substantially round pellets; subsequently coating the pellets with a hydrocarbon oil having a relatively high vapor pressure relative to the vapor pressure of the first named hydrocarbon oil; and subsequently preheating the substantially round coated pellets slowly in an oxidizing atmosphere at a temperature which rises from room temperature to a maximum temperature between 1000° C. and 1260° C. for a period of time of from about 15 minutes to about 22 minutes; maintaining the pellets in the oxidizing atmosphere and at a temperature of at least 1000° C. for a period of time of from 5 to 10 minutes to expand the pellets.

2. A process of producing lightweight aggregate which comprises the steps of reducing clay-like raw materials to particles not substantially larger than the size which will pass through a 20-mesh screen; adding hydrocarbon oil to said material in an amount of between 2% and 5% of the material by weight; subsequently adding water to said material of the order of about 15 to 25 parts of water by weight to 100 parts of the raw material; subsequently forming the mixture into substantially rounded pellets each having a volume of from 0.25 cubic inches to about 4.0 cubic inches; subsequently treating the pellets with a hydrocarbon oil having a relatively high vapor pressure relative to the vapor pressure of the first named hydrocarbon oil; and subsequently heating the substantially round coated pellets in an oxidizing atmosphere at a temperature which rises from room temperature to a maximum temperature between 1000° C. to 1260° C.

3. A process of producing lightweight aggregate which comprises the steps of adding a hydrocarbon oil to dry clay-like materials; subsequently adding water to said material of the order of about 15 to 25 parts of water by weight to 100 parts of the raw material; subsequently forming the mixture into substantially rounded pellets; subsequently treating the pellets with a hydrocarbon oil having a relatively high vapor pressure relative to the vapor pressure of the first named hydrocarbon oil; and subsequently heating the substantially round coated pellets in an oxidizing atmosphere at a temperature which rises from room temperature to a maximum temperature between 1000° C. to 1260° C.

4. A process of producing lightweight aggregate which comprises the steps of reducing clay-like raw materials to particles not substantially larger than the size which will pass through a 20-mesh screen; adding a hydrocarbon oil having a low vapor pressure to said material; subsequently adding water to said material of the order of about 15 to 25 parts of water by weight to 100 parts of the raw material; subsequently forming the mixture into substantially rounded pellets; adding a hydrocarbon oil having a relatively high vapor pressure relative to the vapor pressure of the first named hydrocarbon oil to the pellets; and subsequently heating the substantially round pellets in an oxidizing atmosphere at a temperature which rises from room temperature to a maximum temperature between 1000° C. and 1260° C.

5. A process of producing lightweight aggregate which comprises the steps of reducing clay-like raw materials to particles substantially not larger than the size which will pass through a 20-mesh screen; mixing crude hydrocarbon oil in an amount of between 2% and 5% of the material by weight thoroughly with said material; subsequently mixing water thoroughly with said material of the order of about 15 to 25 parts of water by weight to 100 parts of the raw material; subsequently forming the mixture into slugs; subsequently forming the slugs into substantially round pellets; adding a hydrocarbon oil having a relatively high vapor pressure relative to the vapor pressure of the first named hydrocarbon oil to the pellets; and subsequently heating the substantially round pellets in an oxidizing atmosphere at a temperature which rises from room temperature to a maximum temperature between 1000° C. to 1260° C.

6. A process of producing lightweight aggregate which comprises the steps of mixing a crude hydrocarbon oil thoroughly with dry clay-like materials; subsequently mixing water thoroughly with the material of the order of about 15 to 25 parts of water by weight to 100 parts of the raw material; subsequently forming the mixture into substantially round pellets; adding a hydrocarbon oil having a relatively high vapor pressure relative to the vapor pressure of the first named hydrocarbon oil to the pellets; and subsequently heating the substantially round pellets in an oxidizing atmosphere at a temperature rising from room temperature to a maximum temperature between 1000° C. to 1260° C.

7. A process of producing lightweight aggregate which comprises the steps of reducing clay-like raw materials to particles not substantially larger than the size which will pass through a 20-mesh screen; mixing a hydrocarbon oil thoroughly with said material; subsequently mixing water thoroughly with said material of the order of about 15 to 25 parts of water by weight to 100 parts of the raw material; subsequently forming the mixture into substantially rounded pellets; adding a hydrocarbon having a relatively high vapor pressure relative to the vapor pressure of the first named hydrocarbon oil to the pellets; and subsequently heating the round pellets in an oxidizing atmosphere at a temperature which rises from room temperature to a maximum temperature between 1000° C. and 1260° C.

8. The process of forming lightweight aggregate which comprises the steps of mixing a clay-like material with oil; subsequently mixing the clay-like material with water; subsequently forming the material into pellets; subsequently coating the pellets with a distilled hydrocarbon having a higher vapor pressure than the oil; and subsequently firing the pellets.

9. The process of forming lightweight aggregate which comprises the steps of grinding a clay-like material to a fine size; screening said material; mixing said clay-like material with oil; subsequently mixing the clay-like material with water; subsequently forming the material into pellets; subsequently coating the pellets with a distilled hydrocarbon having a higher vapor pressure than the oil; preheating the pellets at a relatively low temperature relative to the temperature at which it is to be subsequently fired; and subsequently firing at a higher temperature for a period of time of at least 2 minutes.

10. The process of forming lightweight aggregate which comprises the steps of mixing a clay-like material with a hydrocarbon and with water; subsequently forming the material into pellets; subsequently coating the pellets with a hydrocarbon having a relatively higher vapor pressure than the first mentioned hydrocarbon; subsequently preheating the pellets at a relatively low temperature relative to the temperature at which it is later to be fired; and subsequently firing the pellets at a higher temperature.

11. The process of forming lightweight aggregate which comprises the steps of mixing a clay-like material with a hydrocarbon and with water; subsequently forming the material into pellets; subsequently coating the pellets with a hydrocarbon having a relatively lower flash point than the first mentioned hydrocarbon; subsequently preheating the pellets at a relatively low temperature relative to the temperature at which it is later to be fired; and subsequently firing the pellets at a higher temperature.

References Cited in the file of this patent

UNITED STATES PATENTS

| Number | Name | Date |
|---|---|---|
| 1,805,020 | Smith | May 12, 1931 |
| 2,024,176 | Lloyd | Dec. 17, 1935 |
| 2,035,845 | Stanton | Mar. 31, 1936 |
| 2,112,380 | Price | Mar. 29, 1938 |
| 2,339,003 | Boer et al. | Jan. 11, 1944 |
| 2,478,757 | Foster | Aug. 9, 1949 |
| 2,544,752 | Gelbman | Mar. 13, 1951 |